(12) United States Patent
Ichikawa et al.

(10) Patent No.: US 10,661,395 B2
(45) Date of Patent: May 26, 2020

(54) ALUMINUM-ALLOY BRAZING SHEET

(71) Applicant: UACJ Corporation, Tokyo (JP)

(72) Inventors: Junichi Ichikawa, Aichi (JP); Tomoki Yamayoshi, Aichi (JP); Yasunaga Itoh, Aichi (JP); Yutaka Yanagawa, Aichi (JP)

(73) Assignee: UACJ CORPORATION, Tokyo (JP)

( * ) Notice: Subject to any disclaimer, the term of this patent is extended or adjusted under 35 U.S.C. 154(b) by 238 days.

(21) Appl. No.: 15/325,530

(22) PCT Filed: Jul. 29, 2015

(86) PCT No.: PCT/JP2015/071554
§ 371 (c)(1),
(2) Date: Jan. 11, 2017

(87) PCT Pub. No.: WO2016/017716
PCT Pub. Date: Feb. 4, 2016

(65) Prior Publication Data
US 2017/0151637 A1 Jun. 1, 2017

(30) Foreign Application Priority Data

Jul. 30, 2014 (JP) .................................. 2014-154995

(51) Int. Cl.
*B23K 1/00* (2006.01)
*B23K 35/28* (2006.01)
(Continued)

(52) U.S. Cl.
CPC .............. *B23K 35/286* (2013.01); *B23K 1/00* (2013.01); *B23K 1/008* (2013.01); *B23K 1/19* (2013.01);
(Continued)

(58) Field of Classification Search
None
See application file for complete search history.

(56) References Cited

U.S. PATENT DOCUMENTS

| 3,807,033 A | 4/1974 | Schoer et al. |
| 3,811,177 A | 5/1974 | Schoer et al. |

(Continued)

FOREIGN PATENT DOCUMENTS

| CN | 1416377 A | 5/2003 |
| CN | 1831171 A | 9/2006 |

(Continued)

OTHER PUBLICATIONS

ASM Specialty Handbook—Aluminum and Aluminum Alloys, ASM International, Jun. 2010, pp. 21 and 40-45.
(Continued)

*Primary Examiner* — Daniel J. Schleis
(74) *Attorney, Agent, or Firm* — J-Tek Law PLLC; Jeffrey D. Tekanic; Scott T. Wakeman

(57) ABSTRACT

A brazing sheet for brazing in an inert-gas atmosphere without using a flux has a core and a filler material clad to one side or both sides of the core. The core has a chemical composition that contains Mg: 0.35-0.8% (mass %; likewise hereinbelow), the remainder being composed of Al and unavoidable impurities. The filler material has a chemical composition that contains Si: 6-13% and Bi: 0.001-0.05% and Mg: limited less than 0.05%, the remainder being composed of Al and unavoidable impurities.

23 Claims, 2 Drawing Sheets

(51) Int. Cl.

| | | |
|---|---|---|
| *B23K 31/02* | (2006.01) | |
| *B23K 35/22* | (2006.01) | |
| *C22C 21/00* | (2006.01) | |
| *B23K 1/19* | (2006.01) | |
| *B23K 35/02* | (2006.01) | |
| *B32B 15/01* | (2006.01) | |
| *B23K 1/008* | (2006.01) | |
| *C22C 21/02* | (2006.01) | |
| *C22C 21/06* | (2006.01) | |

(52) U.S. Cl.
CPC .......... *B23K 31/02* (2013.01); *B23K 35/0222* (2013.01); *B23K 35/0233* (2013.01); *B23K 35/0238* (2013.01); *B23K 35/22* (2013.01); *B23K 35/28* (2013.01); *B32B 15/016* (2013.01); *C22C 21/00* (2013.01); *C22C 21/02* (2013.01); *C22C 21/06* (2013.01); *Y10T 428/12764* (2015.01)

(56) References Cited

U.S. PATENT DOCUMENTS

| | | | |
|---|---|---|---|
| 3,853,547 A | 12/1974 | Singleton | |
| 3,900,151 A | 8/1975 | Heinz et al. | |
| 4,121,750 A | 10/1978 | Schoer et al. | |
| 4,173,302 A | 11/1979 | Schultze et al. | |
| 4,207,662 A | 6/1980 | Takenaka | |
| 4,241,148 A | 12/1980 | Schoer et al. | |
| 4,574,878 A | 3/1986 | Sugiyama et al. | |
| 4,626,295 A | 12/1986 | Sasaki et al. | |
| 4,645,119 A | 2/1987 | Haramaki et al. | |
| 4,905,887 A | 3/1990 | Schoer et al. | |
| 4,906,307 A | 3/1990 | Fujiyoshi | |
| 4,991,647 A | 2/1991 | Kawabe et al. | |
| 5,171,377 A | 12/1992 | Shimizu et al. | |
| 5,176,205 A | 1/1993 | Anthony | |
| 5,232,788 A | 8/1993 | Timsit et al. | |
| 5,316,206 A | 5/1994 | Syslak et al. | |
| 5,418,072 A | 5/1995 | Baldantoni et al. | |
| 5,450,666 A | 9/1995 | Conn et al. | |
| 6,113,667 A | 9/2000 | Hyogo et al. | |
| 6,234,243 B1 | 5/2001 | Murching et al. | |
| 6,341,651 B1 | 1/2002 | Ohta | |
| 6,391,129 B1* | 5/2002 | Hurd .................. C22C 21/00 148/690 |
| 7,926,701 B2* | 4/2011 | Dulac .................. B32B 15/016 228/262.51 |
| 8,043,711 B2 | 10/2011 | Koshigoe et al. | |
| 8,247,083 B2* | 8/2012 | Izumi ................ B23K 35/0233 428/654 |
| 8,413,876 B2* | 4/2013 | Dulac ................ B23K 1/0012 228/219 |
| 9,744,610 B2 | 8/2017 | Terada et al. | |
| 9,976,201 B2 | 5/2018 | Ando et al. | |
| 2001/0040180 A1 | 11/2001 | Wittebrood et al. | |
| 2002/0005230 A1 | 1/2002 | Watsuji et al. | |
| 2002/0012811 A1 | 1/2002 | Wittebrood et al. | |
| 2002/0037425 A1 | 3/2002 | Mooij et al. | |
| 2002/0086179 A1 | 7/2002 | Wittebrood et al. | |
| 2002/0102431 A1 | 8/2002 | Wittebrood et al. | |
| 2003/0051342 A1 | 3/2003 | Hasegawa et al. | |
| 2003/0084569 A1 | 5/2003 | Hyogo et al. | |
| 2003/0091856 A1 | 5/2003 | Wittebrood et al. | |
| 2003/0183376 A1 | 10/2003 | Abell et al. | |
| 2004/0009358 A1 | 1/2004 | Scott et al. | |
| 2004/0028940 A1 | 2/2004 | Toyama et al. | |
| 2004/0121180 A1 | 6/2004 | Wittebrood et al. | |
| 2004/0238605 A1 | 12/2004 | Nishimura et al. | |
| 2005/0006065 A1 | 1/2005 | Katsumata et al. | |
| 2005/0011636 A1 | 1/2005 | Miyachi et al. | |
| 2005/0034848 A1 | 2/2005 | Ueda | |
| 2005/0076506 A1 | 4/2005 | Kanada | |
| 2005/0189047 A1 | 9/2005 | Hasegawa et al. | |
| 2006/0000586 A1 | 1/2006 | Katsumata et al. | |
| 2006/0102691 A1 | 5/2006 | Toyama et al. | |
| 2006/0231170 A1 | 10/2006 | Parson et al. | |
| 2007/0017605 A1 | 1/2007 | Nakamura et al. | |
| 2007/0099023 A1 | 5/2007 | Dulac et al. | |
| 2007/0158386 A1 | 7/2007 | Dulac et al. | |
| 2007/0251091 A1 | 11/2007 | Minami et al. | |
| 2008/0003451 A1 | 1/2008 | Suzuki et al. | |
| 2008/0047683 A1 | 2/2008 | Takahashi | |
| 2009/0165893 A1 | 7/2009 | Akazawa et al. | |
| 2009/0165901 A1 | 7/2009 | Koshigoe et al. | |
| 2009/0233118 A1 | 9/2009 | Katoh et al. | |
| 2010/0051247 A1 | 3/2010 | Sogabe et al. | |
| 2010/0112370 A1 | 5/2010 | Ueda et al. | |
| 2010/0116472 A1 | 5/2010 | Katsumata et al. | |
| 2010/0266871 A1 | 10/2010 | Matsuo et al. | |
| 2011/0114228 A1 | 5/2011 | Nakamura et al. | |
| 2011/0240280 A1 | 10/2011 | Izumi et al. | |
| 2011/0287276 A1 | 11/2011 | Izumi et al. | |
| 2011/0315748 A1 | 12/2011 | Dulac et al. | |
| 2012/0145365 A1 | 6/2012 | Yamashita et al. | |
| 2012/0177947 A1* | 7/2012 | Abrahamsson ...... B23K 35/002 428/654 |
| 2013/0118013 A1 | 5/2013 | Yamashita et al. | |
| 2013/0299564 A1 | 11/2013 | Steiner et al. | |
| 2013/0306714 A1 | 11/2013 | Wittebrood | |
| 2014/0186560 A1 | 7/2014 | Katsumata et al. | |
| 2014/0322558 A1 | 10/2014 | Takeda et al. | |
| 2014/0329109 A1 | 11/2014 | Takewaka et al. | |
| 2015/0000783 A1 | 1/2015 | Terada et al. | |
| 2015/0068713 A1 | 3/2015 | Sucke et al. | |
| 2015/0118517 A1 | 4/2015 | Itoh et al. | |
| 2015/0165564 A1* | 6/2015 | Ahl .................. B23K 1/012 428/654 |
| 2015/0239071 A1 | 8/2015 | Kiga | |
| 2015/0273635 A1 | 10/2015 | Kumagai et al. | |
| 2016/0031045 A1 | 2/2016 | Izumi et al. | |
| 2016/0097607 A1 | 4/2016 | Katsumata et al. | |
| 2016/0169600 A1 | 6/2016 | Fukumoto et al. | |
| 2016/0290743 A1 | 10/2016 | Otsuki et al. | |
| 2016/0319401 A1 | 11/2016 | Ando et al. | |
| 2016/0332209 A1 | 11/2016 | Yamashita et al. | |
| 2017/0151637 A1 | 6/2017 | Ichikawa et al. | |
| 2017/0205159 A1 | 7/2017 | Yamashita et al. | |
| 2017/0205160 A1 | 7/2017 | Yanagawa et al. | |
| 2017/0320170 A1 | 11/2017 | Yanagawa et al. | |
| 2018/0133845 A1 | 5/2018 | Itoh et al. | |

FOREIGN PATENT DOCUMENTS

| | | |
|---|---|---|
| CN | 1886527 A | 12/2006 |
| CN | 101871062 A | 10/2010 |
| CN | 102003841 A | 4/2011 |
| CN | 102803891 A | 11/2012 |
| CN | 103097850 A | 5/2013 |
| DE | 19744734 A1 | 4/1999 |
| DE | 102008009695 A1 | 9/2008 |
| DE | 202012003090 U1 | 4/2012 |
| DE | 102012200828 * | 8/2012 |
| EP | 0659519 A1 | 6/1995 |
| EP | 0847830 A2 | 6/1998 |
| EP | 1127653 A2 | 8/2001 |
| EP | 1287934 A1 | 3/2003 |
| EP | 1533070 A1 | 5/2005 |
| EP | 1679146 A1 | 7/2006 |
| EP | 2418042 A1 | 2/2012 |
| EP | 2447662 A1 | 5/2012 |
| EP | 2578344 A1 | 4/2013 |
| EP | 2848354 A1 | 3/2015 |
| JP | S53119762 A | 10/1978 |
| JP | S53131253 A | 11/1978 |
| JP | S6182992 A | 4/1986 |
| JP | S61293699 A | 12/1986 |
| JP | H01225736 A | 9/1989 |
| JP | H03124394 A | 5/1991 |
| JP | H03226396 A | 10/1991 |
| JP | H0525576 A | 2/1993 |
| JP | H07227695 A | 8/1995 |
| JP | H07303858 A | 11/1995 |
| JP | H0852565 A | 2/1996 |

(56) References Cited

FOREIGN PATENT DOCUMENTS

| | | | |
|---|---|---|---|
| JP | H0985433 A | 3/1997 | |
| JP | H1034375 A | 2/1998 | |
| JP | H1034378 A | 2/1998 | |
| JP | H1180870 A | 3/1999 | |
| JP | H11183085 A | 7/1999 | |
| JP | H11221696 A | 8/1999 | |
| JP | H11285817 A | 10/1999 | |
| JP | H11335764 A | 12/1999 | |
| JP | H11347783 A | 12/1999 | |
| JP | 2000063970 A | 2/2000 | |
| JP | 2000167688 A | 6/2000 | |
| JP | 2000202620 A | 7/2000 | |
| JP | 2000202680 A | 7/2000 | |
| JP | 2000225461 A | 8/2000 | |
| JP | 3160099 B2 | 4/2001 | |
| JP | 3212927 B2 | 9/2001 | |
| JP | 2002079370 A | 3/2002 | |
| JP | 2002161323 A | 6/2002 | |
| JP | 2002267382 A | 9/2002 | |
| JP | 200394165 A | 4/2003 | |
| JP | 2003126986 A | 5/2003 | |
| JP | 2004025297 A | 1/2004 | |
| JP | 2004042086 A | 2/2004 | |
| JP | 2004076057 A | 3/2004 | |
| JP | 2004084060 A | 3/2004 | |
| JP | 2004330233 A | 11/2004 | |
| JP | 2005060790 A | 3/2005 | |
| JP | 2005523163 A | 8/2005 | |
| JP | 2005256166 A | 9/2005 | |
| JP | 2006043735 A | 2/2006 | |
| JP | 2006175500 A | 7/2006 | |
| JP | 2006213934 A | 8/2006 | |
| JP | 2006255755 A | 9/2006 | |
| JP | 2006307292 A | 11/2006 | |
| JP | 2006348372 A | 12/2006 | |
| JP | 2007031730 A | 2/2007 | |
| JP | 2007039753 A | 2/2007 | |
| JP | 2007044713 A | 2/2007 | |
| JP | 2007512143 A | 5/2007 | |
| JP | 2007178062 A | 7/2007 | |
| JP | 2007216283 A | 8/2007 | |
| JP | 2007260733 A | 10/2007 | |
| JP | 2008006480 A | 1/2008 | |
| JP | 2008100283 A | 5/2008 | |
| JP | 2008121108 A | 5/2008 | |
| JP | 2008208416 A | 9/2008 | |
| JP | 2008261025 A | 10/2008 | |
| JP | 2009058139 A | 3/2009 | |
| JP | 2009058167 A | 3/2009 | |
| JP | 2009068083 A | 4/2009 | |
| JP | 2009106947 A | 5/2009 | |
| JP | 2009142870 A | 7/2009 | |
| JP | 2009184017 A | 8/2009 | |
| JP | 2010075965 A | 4/2010 | |
| JP | 2010075966 A | 4/2010 | |
| JP | 2010247209 A | 11/2010 | |
| JP | 2010255014 A | 11/2010 | |
| JP | 2011000614 A | 1/2011 | |
| JP | 2011136358 A | 7/2011 | |
| JP | 2011247459 A | 12/2011 | |
| JP | 2012067994 A | 4/2012 | |
| JP | 2013189659 A | 9/2013 | |
| JP | 2013233552 A | 11/2013 | |
| JP | 2014050861 A | 3/2014 | |
| JP | 2014083570 A | 5/2014 | |
| JP | 2014226704 A | 12/2014 | |
| WO | 2005061165 A1 | 7/2005 | |
| WO | 2005061743 A1 | 7/2005 | |
| WO | 2010147170 A1 | 12/2010 | |
| WO | 2011034496 A2 | 3/2011 | |
| WO | 2012104147 A1 | 8/2012 | |
| WO | 2015001725 A1 | 1/2015 | |
| WO | 2015104760 A1 | 7/2015 | |
| WO | 2016017716 A1 | 2/2016 | |

OTHER PUBLICATIONS

Discussion of the Relevance of the Observation of Third Party filed on Oct. 9, 2018, prepared by the European Patent Examiner and posted (made available to the public) on the European Patent Register on Oct. 29, 2018.
Observation of Third Party filed on Oct. 9, 2018 in counterpart EP application No. 15826433, and claims 1-2 discussed therein.
Extended European Search Report from the European Patent Office dated Aug. 7, 2017 in related EP application No. 17150415.2, including European Search Opinion, European Search Report, and examined claims 1-15.
Extended European Search Report from the European Patent Office dated Nov. 15, 2017 in related EP application No. 15 826 433.3, including European Search Opinion, European Search Report, and examined claims 1-6.
Unpublished U.S. Appl. No. 15/385,342.
English translation of International Preliminary Report on Patentability for parent application No. PCT/JP2015/071554.
English translation of International Search Report for parent application No. PCT/JP2015/071554.
"Aluminum-Magnesium-Silicon (6000) Alloys", published May 2003, found at: http://www.totalmateria.com/Article74.htm.
Brazing of Stainless Steel to Aluminium for Pots and Pans Production, Oct. 2010, webpage found at: http://www.aluminium-brazing.com/2010/10/.
Elkem Bremanger, Result Analysis Report for Silgrain 10 micron dated Aug. 20, 2008.
J.R. Davis, "Aluminum and Aluminum Alloys", Pages from the third edition of ASM Specialty Handbook, ASM International, 1993.
Malvern White Paper entitled "A Basic Guide to Particle Characterization", 2015, webpage found at: http://www.malvern.com/en/support/resource-center/Whitepapers/WP120620BasicGuidePartChar.aspx.
Nocolok® Sil Flux fg brochure, 2015, webpage found at: http://www.aluminium-brazing.com/sponsor/nocolok/Files/PDFs/31360.pdf.
Unpublished U.S. Appl. No. 15/572,945.
Office Action dated Oct. 26, 2017 from Chinese Patent Office in related Chinese application No. 20150033323.3, and machine translation thereof.
Dr. Takeyoshi Doko et al., "Brazing sheet for inner part brazing without flux", Session B materials, International Congress—Aluminium Brazing—May 26-28, 2004.
Office Action from the Japanese Patent Office dated Jun. 4, 2019 in related Japanese application No. 2016-538410, and translation thereof.
Examination Report from the European Patent Office dated Mar. 18, 2019 in related EP application No. 16 799 905.1 including grounds for rejection and examined claims 1-12.
Office Action from the Chinese Patent Office dated Aug. 30, 2018 in related Chinese application No. 201610943693.7, and machine translation thereof.
Office Action from the Chinese Patent Office dated Jan. 22, 2019 in related Chinese application No. 201680028376.0, and machine translation thereof.
Office Action from the Chinese Patent Office dated Aug. 7, 2018 in related Chinese application No. 201680028376.0, and machine translation thereof.
Office Action from the Chinese Patent Office dated Jul. 6, 2018 in related Chinese application No. 201680034672.1, and machine translation thereof.
Third party observations dated Feb. 15, 2019 in related application European patent application 16 799 905.1.
Office Action from the Korean Patent Office dated Mar. 28, 2018 in related Korean application No. 10-2016-018208, and translation thereof.
Registration Record Series Teal Sheets—"International Alloy Designations and Chemical Composition Limits for Wrought Alminum and Wrought Alminum Alloys"; The Aluminum Association; pp. 15-27 Apr. 2006.

(56) References Cited

OTHER PUBLICATIONS

Affidavit of Mrs Fanny MAS dated Sep. 19, 2019.
Aluminiumtaschenbuch [The Aluminum Manual] vol. 1, pp. 95, 610-611, 676-677, Published 1998.
C. Sigli et al.."Computer-aided optimization of aluminum alloys for airframe applications"; Materials Science Forum, vols. 426-432 pp. 351-356; published: 2003.
J.Ruste; "Microanalyse X quantitative:quelle fiabilité pour quelle analyse?; Introduction, Les principes de l'analyse quantitative" [Translation: Quantitative X microanalysis: what reliability for what analysis?; Introduction, Principles of quantitative analysis]; Groupement National de Microscopie Electronique à Balayage et de microanalyses ; Dec. 3-4, 2009.
Communication of a notice of opposition dated Sep. 25, 2019 by the European Patent Office in counterpart European patent application No. 15826433.3, including Opposition Transmittal Letter of the Opponent Hydro Aluminum Rolled Products GmbH filed Sep. 19, 2019, Grounds for Opposition (in German) and English translation of the Grounds for Opposition.
Communication of a notice of opposition dated Sep. 23, 2019 by the European Patent Office in counterpart European patent application No. 15826433.3, including Opposition Transmittal Letter of the Opponent C-TEC Constellium Technology Center filed Sep. 17, 2019, Grounds for Opposition (in French) and English translation of the Grounds for Opposition.
Machine Translation of JP priority application No. 2014-154995.

\* cited by examiner

ALUMINUM-ALLOY BRAZING SHEET

CROSS-REFERENCE

This application is the US national stage of International Patent Application No. PCT/JP2015/071554 filed on Jul. 29, 2015, which claims priority to Japanese Patent Application No. 2014-154995 filed on Jul. 30, 2014.

TECHNICAL FIELD

The present invention relates to an aluminum-alloy brazing sheet.

BACKGROUND ART

The technique of joining by brazing is a joining technique that is capable of joining minute and numerous portions at once. Brazing techniques that use an aluminum alloy (including pure aluminum; likewise hereinbelow) are used in the manufacture of various heat exchangers because of the excellent lightweightness and thermal conductivity of aluminum alloys. In the brazing of an aluminum alloy, brazing is performed by wetting materials-to-be-joined with a filler material that has melted. In order for the melted filler material to wet the materials to be joined, it is necessary to break up oxide films that cover the surface of the filler material and the like. Brazing methods, vacuum-brazing methods, and the like in which flux is used are known as methods of breaking up these oxide films.

A brazing method that uses flux (commonly known as the NB method) is a method in which a fluoride-based flux is applied to the surface of a filler material, after which brazing is performed in a nitrogen-gas-atmosphere furnace; this method is the most frequently used one. However, the NB method is limited in the reduction of manufacturing costs because it requires processes for applying, drying, and cleaning the flux. In addition, because flux residue has become a problem in the coolers of electronic parts, which are being installed in hybrid vehicles, electric vehicles, and the like in recent years, there is a demand for a brazing method in which flux is not used.

The vacuum-brazing method is a technique that performs brazing by making use of the break-up of oxide films by the evaporation of Mg (magnesium) in a material during heating when brazing is being performed. In vacuum-brazing methods, although brazing can be performed without using flux, these methods tend to be subject to the effects of the vacuum level, the dew point, and the like, and therefore brazeability does not stabilize. In addition, the vacuum-brazing method has problems, such as: the vacuum equipment is extremely expensive; a large amount of electric power is needed to operate the vacuum equipment; and it is necessary to clean the furnace wall periodically.

In contrast, attempts are being made (e.g., Patent Document 1) to perform fluxless brazing using a brazing sheet of an Al—Si—Mg (aluminum-silicon-magnesium)-based filler material in an inert-gas atmosphere at atmospheric pressure. If fluxless brazing is performed at atmospheric pressure, then active evaporation of the Mg does not occur, and consequently the effect of breaking up the oxide films by the evaporation of the Mg cannot be expected. However, in this case, fine oxides are formed from the Mg within the filler material. These oxides function to fragment the dense oxide films present on the surfaces of the filler material, the materials to be joined, and the like, which makes it possible to cause the filler material to flow, even at atmospheric pressure.

Incidentally, there is a problem in that Mg contained in the filler material tends to be readily oxidized by oxygen, moisture, and the like in the atmosphere during manufacture of the brazing sheet, during heating when brazing is being performed, and the like. If a thick MgO layer is formed on the filler-material surface owing to the oxidation of the Mg, then brazeability degrades. Consequently, the sites where these brazing sheets can be used are limited; for example, they are used in brazing inside hollow structures where the surface of the filler material tends not to oxidize. In addition, when brazing is performed using these brazing sheets, it is necessary to perform, for example: a pretreatment in which oxides are removed by etching the surfaces of the filler material in advance before brazing is performed; strict control of the in-furnace environment, such as by reducing as much as possible the oxygen concentration and the dew point inside the brazing furnace (e.g., reducing the oxygen concentration to 5 ppm or less and the dew point to −60° C. or less); and the like. However, the etching treatment, such as by acid washing, and the reduction of the in-furnace oxygen concentration necessitate the introduction of new equipment, which becomes a major burden for heat exchanger manufacturers.

Accordingly, as methods of preventing the oxidation of Mg in the filler material, methods have been proposed (Patent Documents 2, 3) in which a thin film, composed of a metal having a melting point higher than that of the filler material, is provided on the filler-material surface. However, in this case, there is a problem in that, owing to the presence of the thin film, it takes more time from when the filler material melts until the filler material flows than the case in which the thin film is not present. Consequently, there is a problem in that the formation of the joint is delayed, and therefore brazing failures occur. In addition, if the thin film is clad in order to prevent the oxidation of Mg in the filler material, then materials cost greatly increases.

In addition, methods have been proposed (Patent Documents 3-6) in which Mg is added to a core and not to the filler material. However, even in these methods, there are limits to the prevention of the oxidation of Mg owing to the oxygen and the like in the atmosphere. In Patent Documents 3, 4, 6, methods are also described in which the brazed article is covered with a covering during heating when brazing is being performed in order to protect it from the atmosphere. However, in this case, it is necessary to prepare a covering that conforms to the brazed article, and to introduce new equipment. In addition, Patent Document 5 describes a method in which fluxless brazing is performed only inside a hollow body, where the effects of the oxygen concentration are small, and brazing outside of the hollow body is performed using flux. However, in this method, it is necessary to apply the flux. As described above, in the case of materials in which the only thing done is the addition of Mg to the core, satisfactory fluxless brazeability was not achieved in an atmosphere (e.g., an oxygen concentration of 15-50 ppm and a dew point of −35 to −50° C.) corresponding to the interior of a common production furnace.

To improve the brazeability of a brazing sheet in which Mg has been added to the core, methods have also been proposed (Patent Documents 7, 8) in which the elements Li (lithium), Be (beryllium), or the like are added to the filler material. However, in both methods, because Li, Be, or the like adversely oxidize during the manufacture of the brazing sheet, a pretreatment becomes necessary in which surface oxides are eliminated by etching. In addition, because readily-oxidizable elements are added to the filler material, the filler material tends to be subject to the effects of the oxygen concentration in the atmosphere, the dew point, and the like. Therefore, brazeability does not stabilize.

Other than elements such as Mg that have the effect of breaking up oxide films, Bi (bismuth) can be given as an example of an element that improves brazeability. As an element that reduces the surface tension of molten-filler material and improves brazeability, Bi has been traditionally used in vacuum-brazing methods (e.g., the Al—Si—Mg—Bi-based filler-material alloy in the JIS A4104 alloy, and the like). The effects of Bi are obtained likewise even in fluxless brazing at atmospheric pressure (Patent Document 7).

In Patent Document 7 and Patent Document 9, readily-oxidizable elements, i.e. Ca (calcium), Li, Na (sodium), Be, Y (yttrium), La (lanthanum), and Ce (cerium), are added to improve brazeability. However, because these elements form thick oxide films on the filler-material surface during the manufacture of the brazing sheet, they all require an etching treatment or the like. To obtain satisfactory fluxless brazeability without performing the etching treatment or the like in an atmosphere that corresponds to the interior of a production furnace, it is necessary either to not add these readily-oxidizable elements to the filler material or to rigorously reduce the amounts added to a level at which adverse effects on brazeability do not appear.

Furthermore, to obtain satisfactory fluxless brazeability without performing an etching treatment or the like, in which the introduction of acid-washing equipment and waste-liquid-treatment equipment are essential, it is necessary to restrict the addition of readily-oxidizable elements, i.e. Mg, Li, Be, into the filler material.

In addition, because brazing sheets for fluxless brazing use readily-oxidizable elements as the elements that replace the function of the flux, the surface oxidizes and markedly changes color after heating when brazing is performed. As a result, there is a risk that brazeability, external appearance, and the like will be impaired. In addition, because Bi, which is added to reduce the surface tension of the molten-filler material and to improve brazeability, is an element that has a higher potential than Al, the corrosion resistance of the filler material adversely decreases. As described above, it is necessary to design brazing sheets for fluxless brazing considering not only simply the improvement of brazeability but also the external appearance and the corrosion resistance after brazing.

PRIOR ART LITERATURE

Patent Documents

Patent Document 1
  Japanese Laid-open Patent Publication 2010-247209
Patent Document 2
  Japanese Laid-open Patent Publication 2003-126986
Patent Document 3
  Japanese Laid-open Patent Publication 2006-175500
Patent Document 4
  Japanese Laid-open Patent Publication 2006-043735
Patent Document 5
  Japanese Laid-open Patent Publication 2008-100283
Patent Document 6
  Japanese Laid-open Patent Publication H9-85433
Patent Document 7
  Japanese Laid-open Patent Publication 2013-233552
Patent Document 8
  Japanese Laid-open Patent Publication S53-131253
Patent Document 9
  Published Japanese Translation No. 2007-512143

SUMMARY OF THE INVENTION

An object of the present invention is to solve the aforementioned problems in fluxless brazing techniques, to provide a brazing sheet in which fluxless brazeability in an inert-gas atmosphere is satisfactory and corrosion resistance is excellent, and, in turn, to make inexpensive fluxless brazing possible using conventional brazing equipment.

To perform fluxless brazing in an inert-gas atmosphere that can be achieved in a common production furnace and does not use a pretreatment, such as etching, it is considered to be good to use a brazing sheet in which Mg has been added to the core and Bi has been added to the filler material.

As a result of earnest investigation, the present inventors discovered, as will be described below, that sufficient brazeability and corrosion resistance can be obtained, even in an inert-gas atmosphere that can be readily achieved in a common production furnace, by providing strict upper and lower limits to the Mg content in the core and to the Bi content in the filler material and by strictly restricting the contents of those readily-oxidizable elements in the filler material.

A first aspect of the invention is an aluminum-alloy brazing sheet for brazing in an inert-gas atmosphere without using a flux, having a core and a filler material clad to one side or both sides of the core, wherein the core has a chemical composition that contains Mg (magnesium): 0.35-0.8% (mass %; likewise hereinbelow), the remainder being composed of Al (aluminum) and unavoidable impurities; and the filler material has a chemical composition that contains Si (silicon): 6-13% and Bi (bismuth): 0.001-0.05% and is restricted to Mg: less than 0.05%, the remainder being composed of Al and unavoidable impurities.

Another aspect of the present invention is an aluminum-alloy brazing sheet for brazing in an inert-gas atmosphere without using a flux, having a core and a filler material clad to one side or both sides of the core, wherein the core has a chemical composition that contains Mg: 0.35-0.8% (mass %; likewise hereinbelow), the remainder being composed of Al and unavoidable impurities; and the filler material has a chemical composition that contains Si: 6-13% and Bi: 0.001-0.05% and is restricted to Mg: less than 0.05%, Be (beryllium): less than 0.001%, Ca (calcium): less than 0.01%, Li (lithium): less than 0.004%, Na (sodium): less than 0.001%, Y (yttrium): less than 0.01%, La (lanthanum): less than 0.01%, and Ce (cerium): less than 0.01%, the remainder being composed of Al and unavoidable impurities.

The aluminum-alloy brazing sheet according to any one of the above-mentioned aspects, wherein the filler material may further contain Zn (zinc): 0.1-5.0%.

In addition, the core may further contain at least one from among Cu (copper): 0.05-0.8% and Mn (manganese): 0.01-1.8%.

In addition, the core may further contain at least one from among Si: 0.1-1.3%, Fe (iron): 0.3-1.0%, Cr (chrome): 0.01-0.35%, Zn: 0.4% or less, and Ti (titanium): 0.01-0.1%.

In addition, the present invention can be constituted such that the Mg concentration of a surface of the filler material of the brazing sheet, after the temperature has been raised from 450° C. to 577° C. in 5-7 min and a cooling process has been subsequently performed, is less than 0.5 mass %.

With regard to the brazing sheet, brazeability, based on a fluxless-brazing method performed in an inert-gas atmosphere that can be achieved in a common brazing furnace, can be improved beyond that of the past. Therefore, with regard to the brazing sheet, fluxless brazing can be performed using existing inert-gas-atmosphere brazing furnaces without using expensive equipment, such as a vacuum-brazing furnace or a brazing furnace in which the oxygen concentration is controlled so that it is extremely low. In addition, with regard to the brazing sheet, because the contents of readily-oxidizable elements in the filler material are restricted to the specified ranges, a pretreatment, such as an etching treatment, is unnecessary.

As described above, with regard to the brazing sheet, the burden of introducing equipment can be readily lightened and a pretreatment process can be omitted. As a result, the treatment cost of the brazing process can be readily reduced. In addition, with regard to the brazing sheet, because the amount of Bi included in the filler material is restricted to the specified range, the brazing sheet has excellent corrosion resistance.

DETAILED DESCRIPTION

Figure 1:
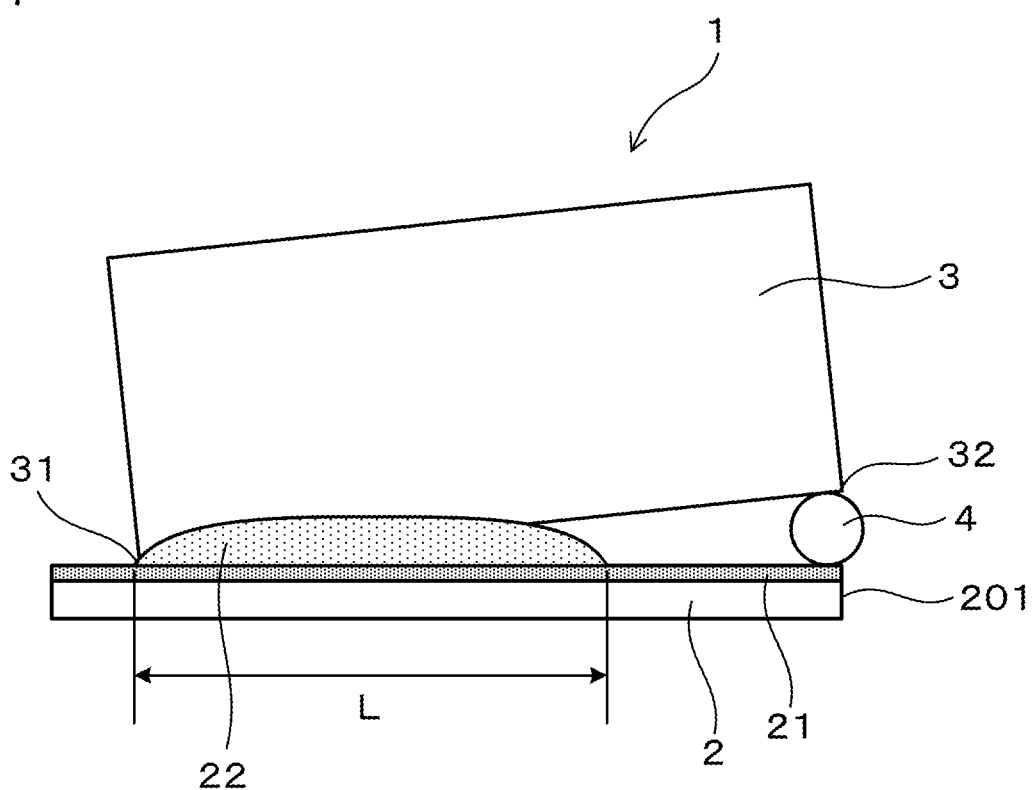
FIG. 1 is a side view of a test piece for a gap-filling test according to an embodiment.

In a fluxless-brazing method, a means that is a flux substitute, which has a function that breaks up oxide films, is needed to obtain brazeability equivalent to that of the NB method, in which a fluoride-based flux is used. To improve fluxless brazeability in an inert-gas atmosphere, there is a means that adds an element having the following two functions. (1) a function that fragments the dense oxide films by reducing the oxide films and producing oxides itself. An element that has such a function also has a function that prevents oxidation of Al by reacting with oxygen, moisture, or the like in the atmosphere. (2) a function that improves the fluidity of the filler material by lowering the surface tension of the molten-filler material.

Elements such as Mg, Be, and Li, for which the free energy of oxide formation is close to the free energy of $Al_2O_3$ formation or is lower than the free energy of $Al_2O_3$ formation, can be used as the element(s) having the function (1). However, because Be is toxic and Li requires specialized equipment for casting, it is preferable to use Mg as the element having function (1).

Incidentally, because elements having function (1) have high chemical reactivity, if added to the filler material, they readily react with oxygen in the atmosphere during hot rolling when the brazing sheets are being manufactured, during heating when brazing is being performed, etc. As a result, there is a problem in that excessive amounts of oxides form on the filler-material surface and, conversely, brazeability is adversely reduced.

It has been reported that a number of elements have function (2); among these, Bi, in which the effect of improving fluidity is high, is widely used. Among elements having function (2), although the free energy of oxide formation of Bi is not as low as that of Mg, Be, and Li, which have function (1) discussed above, it oxidizes more readily than Al. Consequently, in case the Bi content is excessively high, if heating during brazing is performed in the state in which the oxygen concentration in the atmosphere is high, then there is a problem in that large amounts of oxide are formed and, conversely, brazeability is adversely reduced.

Moreover, this tendency is strong with Mg, Be, Ca, Li, Na, Y, La, and Ce, in which the free energy of oxide formation is lower than Bi.

In addition, if the amount of Bi added to the filler material is increased, then black oxides form on the surface, and thereby not only is brazeability impaired but also the external appearance. Furthermore, because Bi is a higher potential element than Al, if the amount of Bi added is increased, then an electric-potential differential arises between the Al and the Bi in the filler material, which leads to a decrease in corrosion resistance.

As described above, the elements for improving brazeability based on fluxless-brazing methods can produce effects of both improving and reducing brazeability. If these elements are added to the filler material, then there is a problem in that the effect of reducing brazeability becomes notable as the oxygen concentration increases in the atmosphere during heating when brazing is being performed. In addition, although both the effect of breaking up the oxide films and the effect of reducing the surface tension of the filler material are essential to perform fluxless brazing, the mutual effects are adversely reduced by these elements forming oxides on the filler-material surface.

To address these problems, the present inventors discovered that, by stipulating the chemical compositions of the core and the filler material as discussed above, it is possible to maximize the effect of breaking up the oxide films by the Mg and the effect of reducing the surface tension by the Bi. That is, with regard to the brazing sheet, Mg having function (1) is added to the core. Thereby, oxidation of Mg can be reduced during manufacture of the brazing sheet and during heating when brazing is being performed. In addition, the Mg content in the core is restricted to the minimum amount necessary so that Mg diffuses into the filler material during heating when brazing is being performed and breaks up the oxide films on the filler-material surface immediately before the filler material melts. Therefore, after Mg that was added to the core diffuses into the filler material during heating when brazing is being performed and after the filler material melts, the function of fragmenting the oxide films can be achieved.

In addition, the Bi and Mg contents in the filler material do not adversely affect brazeability during manufacture of the brazing sheet and during heating when brazing is being performed, and are restricted to the minimum amounts so that post-brazing corrosion resistance is not impaired. As a result, with regard to the brazing sheet, brazeability in an atmosphere that is readily feasible in a common production furnace (e.g., an oxygen concentration of 15-50 ppm and a dew point of −35° C. or less) can be improved beyond that of the past.

The brazing sheet has a configuration in which one side or both sides of an aluminum alloy core having a chemical composition that contains Mg: 0.35-0.8%, the remainder being composed of Al and unavoidable impurities, are clad with an aluminum alloy filler material having a chemical composition that contains Si: 6-13% and Bi: 0.001-0.05%, Mg being restricted to less than 0.05% and the remainder being composed of Al and unavoidable impurities.

<Core>

Mg in the Core: Mg in the core has the effect of diffusing from the core into the filler material during heating when brazing is being performed and breaking up the oxide films. By setting the Mg content in the core to 0.35-0.8%, it is possible both to improve brazeability and to avoid the occurrence of erosion. If the Mg content is less than 0.35%, then the amount of Mg that diffuses into the filler material becomes insufficient, and consequently a sufficient oxidation-film break-up effect cannot be obtained. Therefore, in this case, brazeability decreases. In addition, if the Mg content is more than 0.8%, then the Mg excessively diffuses into the filler material. As a result, the Mg and oxygen in the atmosphere bond, and thereby a large amount of MgO is formed on the filler-material surface, which leads to a decrease in brazeability. Furthermore, in this case, the melting point of the core excessively decreases and, depending on the brazing-heating conditions, erosion tends to occur.

The core of the brazing sheet may contain, in addition to Mg, one or two or more from among Si: 0.1-1.3%, Fe: 0.3-1.0%, Cu: 0.05-0.8%, Mn: 0.01-1.8%, Cr: 0.01-0.35%, Zn: 0.4% or less, and Ti: 0.01-0.1%.

Si in the Core: By bonding with the Mg in the core to form fine $Mg_2Si$, Si in the core has the effect of further increasing strength. The Si content is preferably 0.1-1.3%. In this case, the strength of the core can be further increased. If the Si content is less than 0.1%, then the effect of increasing the strength is poor. If the Si content is more than 1.3%, then the melting point of the core excessively decreases, and there is a risk that local melting will occur during heating when brazing is being performed.

Fe in the Core: By making the crystal grains fine, Fe in the core has the effect of further increasing the strength of the core. The Fe content is preferably 0.3-1.0%. In this case, the strength of the core can be further increased. If the Fe content is less than 0.3%, then the effect of increasing the strength is poor. If the Fe content is more than 1.0%, then large amounts of Al—Fe-based compounds or Al—Fe—Si-based compounds are produced in the core, and there is a risk that this will lead to a decrease in corrosion resistance.

Cu in the Core: By making the core higher potential than the filler material, Cu in the core has the effect of further increasing the corrosion resistance. The Cu content is preferably 0.05-0.8%. In this case, the corrosion resistance of the core can be further improved. If the Cu content is less than 0.05%, then the effect of increasing the corrosion resistance is poor. If the Cu content is more than 0.8%, then the melting point of the core decreases and there is a risk that local melting will occur during heating when brazing is being performed.

Mn in the Core: By making the core higher potential than the filler material, Mn in the core has the effect of further increasing the corrosion resistance. The Mn content is preferably 0.01-1.8%. In this case, the corrosion resistance of the core can be further improved. If the Mn content is less than 0.01%, then the effect of increasing the corrosion resistance is poor. If the Mn content is more than 1.8%, then huge crystallized products tend to be produced during casting, and consequently there is a risk that this will lead to a decrease in workability.

Cr in the Core: By making the core higher potential than the filler material, Cr in the core has the effect of further increasing the corrosion resistance. The Cr content is preferably 0.01-0.35%. In this case, the corrosion resistance of the core can be further improved. If the Cr content is less than 0.01%, then the effect of increasing the corrosion resistance is poor. If the Cr content is more than 0.35%, then huge crystallized products tend to be produced during casting, and consequently there is a risk that this will lead to a decrease in workability.

Zn in the Core: With regard to Zn in the core, there is a possibility that Zn might be incorporated in the core material from a recycled material of the brazing sheet or the like. The Zn content is preferably restricted to 0.4% or less. Because Zn has the effect of making the core lower potential, if the Zn content is excessively high, then there is a risk that this will lead to a decrease in the corrosion resistance of the core. By restricting the Zn content to 0.4% or less, a decrease in corrosion resistance is avoided and a level of corrosion resistance that presents no problem from a practical standpoint can be more readily obtained.

Ti in the Core: By making the crystal grains fine, Ti in the core has the effect of preventing the occurrence of cracks during the processing of the materials. If the Ti content is less than 0.01%, then the effect of preventing cracks is poor. If the Ti content is more than 0.1%, then not only does the materials cost rise, but it also is difficult to obtain the effect of preventing cracks commensurate with the Ti content. Accordingly, from the viewpoint of avoiding an increase in materials cost while obtaining the effect of preventing cracks, the Ti content is preferably 0.01-0.1%.

<Filler Material>

Mg in the Filler Material: If heating when brazing is performed in an inert-gas atmosphere corresponding to the interior of a common production furnace (e.g., an oxygen concentration of 15-50 ppm and a dew point of −35° C. or less), then Mg in the filler material forms MgO on the filler-material surface. Consequently, if the Mg content is excessively high, then a thick MgO layer will form on the filler-material surface, which leads to a decrease in brazeability. A decrease in brazeability can be avoided by restricting the Mg content in the filler material to less than 0.05%.

Si in the Filler Material: Si is added to lower the melting point of the aluminum alloy that constitutes the filler material and thus to cause the aluminum alloy to function as the filler material. By setting the Si content in the filler material to 6-13%, a suitable amount of the molten-filler material can be produced; as a result, brazeability can be improved. In addition, by setting the Si content to 6-13%, a drop in yield can be avoided when the brazing sheets are manufactured. If the Si content is less than 6%, then the amount in the liquid phase (the amount of the molten-filler material) that occurs at the brazing temperature becomes insufficient, and the residual amount in the solid phase (the portion that does not melt) becomes relatively large. As a result, the fluidity of the molten-filler material worsens and brazeability decreases. If the Si content is more than 13%, then an excessive amount of the molten-filler material is produced and dissolves the matrix material; in addition, Si in the filler material diffuses into the core, and thereby the core tends to erode. In addition, because the workability of the filler material decreases and thereby the filler material tends to crack during rolling, the yield drops when the brazing sheets are manufactured.

Bi in the Filler Material: Bi has the effect of reducing the surface tension of the molten-filler material. By setting the Bi content in the filler material to 0.001-0.05%, brazeability can be improved in fluxless brazing. If the Bi content is less than 0.001%, then the effect of improving brazeability is poor. If the Bi content is more than 0.05%, then an excessive amount of the Bi oxidizes when the brazing sheets are manufactured and during heating when brazing is being performed, which leads to a decrease in brazeability. In addition, if the Bi content is more than 0.05%, then large amounts of black oxides are formed on the brazing-sheet surfaces after heating when brazing is being performed, and thereby there is a risk that the external appearance will be impaired.

The filler material of the brazing sheets may further contain Zn.

Zn in the Filler Material: By lowering the melting point of the filler material, Zn can accelerate the flow-start time of the filler material. As a result, brazeability can be further improved. In addition, because Zn has the effect of making the filler material lower potential than the core, the filler material is caused to function as a sacrificial corrosion-preventing layer, and thereby the corrosion resistance of the brazing sheet can be further improved. The Zn content is preferably 0.1-5%. In this case, brazeability and the corrosion resistance of the core can be further improved. If the Zn content is less than 0.1%, then the effect of increasing brazeability and corrosion resistance is poor. If the Zn content is more than 5%, then the melting point of the filler material is excessively lowered and there is a risk that the time that it takes for the filler material to melt will become long. As a result, there is a risk that erosion of the core will occur.

Be, Ca, Li, Na, Y, La, or Ce in the Filler Material: If the filler material contains Be, Ca, Li, Na, Y, La, or Ce, then it is necessary to restrict the contents of these elements to the specified ranges. Because the free energy of oxide formation for these elements is less than or equal to the free energy of $Al_2O_3$ formation, if excessive amounts of these elements are present in the filler material, then oxidation when the brazing sheets are manufactured cannot be avoided. Therefore, in this case, unless the oxides on the surface are removed by performing an etching treatment or the like before heating when brazing is being performed, it is difficult to perform fluxless brazing. In addition, in an atmosphere corresponding to the interior of a common production furnace (e.g., an oxygen concentration of 15-50 ppm and a dew point of −35° C. or less), if Be becomes 0.001% or more, Ca becomes 0.01% or more, Li becomes 0.004% or more, Na becomes 0.001% or more, Y becomes 0.01% or more, La becomes 0.01% or more, or Ce becomes 0.01% or more, then an excessive amount of oxides of these elements will be formed during heating when brazing is being performed, leading to a decrease in brazeability. Accordingly, it is necessary to restrict the amounts of these elements to less than the above-discussed amounts. It is noted that, because these elements are not contained in common pure aluminum ingots and aluminum based master alloys, it is understood that the content of every one of these elements can be restricted to a level that is less than $1/10^{th}$ of the above-discussed amounts as long as manufacturing is carried out using a common pure aluminum ingot or an aluminum based master alloy—without actively adding those elements and without using any recycled materials that contain those elements.

After the temperature of the brazing sheet has been raised from 450° C. to 577° C. in 5-7 min and subsequently a cooling process has been performed, the Mg concentration on the surface of the filler material is preferably less than 0.5 mass %. While the temperature of the brazing sheets is lower than 450° C., solid diffusion of the Mg does not occur to an extent that brazeability will be affected. In addition, when the temperature of the brazing sheet is higher than 577° C., the majority of the filler material melts. Accordingly, the diffusion amount of Mg of the core can be controlled, as discussed above, by the time it takes to raise the temperature of the brazing sheet from 450° C. to 577° C.

By virtue of the brazing sheet having such characteristics, excessive diffusion of Mg to the filler-material surface can be more easily avoided during heating when brazing is being performed. Thereby, excessive oxidation of Mg can be more easily avoided and, in turn, brazeability can be further improved in fluxless brazing. If the Mg concentration of the surface after the above-mentioned processes have been performed becomes 0.5 mass % or more, then the diffusion amount of Mg to the filler-material surface becomes excessive. Consequently, if brazing is performed in a brazing atmosphere that corresponds to the interior of a common production furnace (e.g., a nitrogen-gas atmosphere at atmospheric pressure, an oxygen concentration of 15-50 ppm, and a dew point of −35° C. or less), then there is a risk that brazeability will decrease owing to the oxidation of Mg after the filler material has melted.

Although the thickness of the filler material of the brazing sheet is not particularly limited, the thickness of the filler material is preferably set to 10-100 μm and more preferably is set to 60-100 μm. In this case, tuning of the heating conditions during heating when brazing is being performed can be performed more easily. In case the thickness of the filler material is less than 10 μm, because Mg in the core during heating when brazing is being performed readily diffuses to the surface of the filler material, oxides tend to be formed. Consequently, in this case, the amount of Mg in the core becomes small, and it becomes necessary to shorten the brazing-heating time. As a result, there is a risk that, after having set the amount of Mg in the core in the specified range, it will become difficult to sufficiently ensure the heating time needed to complete the brazing. In addition, in this case, because Si in the filler material readily diffuses into the core, there is a risk that the liquid-phase fraction of the filler material will decrease. As a result, there is a risk of insufficiency of the filler material amount. On the other hand, if the thickness of the filler material is more than 100 μm, then the amount of Mg that diffuses into the filler material will tend to become insufficient, and therefore it will become necessary to increase the amount of the Mg in the core, lengthen the brazing-heating time, or the like.

To avoid these problems, after having set the Mg and Si contents to within the specified ranges, the thickness of the filler material is preferably set to 10-100 μm from the viewpoint of more easily ensuring a sufficient amount of heating time for completing the brazing. From the same viewpoint, the thickness of the filler material is more preferably set to 60-100 μm. In case the thickness of the filler material is 60 μm or more, when brazing is performed at the heating conditions, Mg of the core will, for the most part, not reach the filler-material surface until the filler material has completely melted. Consequently, Mg is scarcely oxidized by oxygen in the atmosphere, and Mg first reaches the surface layer after the filler material has melted. As a result, the effect of fragmenting the oxide films further increases, and thereby brazeability can be further improved.

WORKING EXAMPLES

Working examples of the brazing sheet are explained below. Aspects of the present invention are not limited to the concrete examples of the test materials described below and can be modified as appropriate within a range that does not depart from the gist of the present invention. Furthermore, the core and the filler material of each test material are manufactured by appropriately adding elements, such as Mg, to a common pure aluminum ingot or an aluminum based master alloy, and recycled materials are not used in the manufacture of the core and the filler material. The composition item in each table omits Al and unavoidable impurities, which are the remainder, as well as descriptions of elements whose amounts do not affect the various evaluations.

Test Example 1

The present example is an example of brazing sheets in which the Bi content of the filler materials and the Mg content of the cores were variously modified, as shown in Table 1. The manufacture of the cores was performed by the following procedure. Ingots having the chemical compositions listed in Table 1 were manufactured by semi-continuous casting, and subsequently the ingots were subject to a soaking process. Thereafter, the ingots were milled to prescribed dimensions. The manufacture of the filler materials was performed based on the following procedure. Ingots having the chemical compositions listed in Table 1 were manufactured by semi-continuous casting, and those ingots were hot rolled to prescribed thicknesses. The filler materials were layered on one side of the cores obtained based on the above and then sequentially subject to hot rolling and cold rolling, and thereby the filler materials were clad onto the cores. Thereby, test materials 1-40 were manufactured. The configuration of each test material is shown in Table 1 in greater detail.

TABLE 1

| Test Material | Chemical Composition (mass %) Filler Material Si | Mg | Bi | Core | Thickness (μm) Filler Material | Core | Gap-Filling Length (mm) | Fillet External Appearance | Surface Color Tone | Maximum Corrosion Depth (mm) | Post-Heating Mg Concentration (mass %) |
|---|---|---|---|---|---|---|---|---|---|---|---|
| 1 | 10 | 0.01 | 0.001 | 0.35 | 40 | 360 | 27 | Satisfactory | Satisfactory | 0.18 | 0.027 |
| 2 | 10 | 0.01 | 0.02 | 0.35 | 40 | 360 | 28 | Satisfactory | Satisfactory | 0.19 | 0.026 |
| 3 | 10 | 0.01 | 0.05 | 0.35 | 40 | 360 | 27 | Satisfactory | Satisfactory | 0.17 | 0.027 |
| 4 | 10 | 0.01 | 0.001 | 0.6 | 40 | 360 | 30 | Satisfactory | Satisfactory | 0.2 | 0.045 |
| 5 | 10 | 0.01 | 0.02 | 0.6 | 40 | 360 | 35 | Satisfactory | Satisfactory | 0.18 | 0.046 |
| 6 | 10 | 0.01 | 0.05 | 0.6 | 40 | 360 | 31 | Satisfactory | Satisfactory | 0.17 | 0.044 |
| 7 | 10 | 0.01 | 0.001 | 0.8 | 40 | 360 | 29 | Satisfactory | Satisfactory | 0.19 | 0.454 |
| 8 | 10 | 0.01 | 0.02 | 0.8 | 40 | 360 | 28 | Satisfactory | Satisfactory | 0.19 | 0.436 |
| 9 | 10 | 0.01 | 0.05 | 0.8 | 40 | 360 | 27 | Satisfactory | Satisfactory | 0.18 | 0.448 |
| 10 | 10 | 0.01 | 0.02 | 0.35 | 70 | 330 | 41 | Satisfactory | Satisfactory | 0.2 | 0.028 |
| 11 | 10 | 0.01 | 0.02 | 0.6 | 70 | 330 | 45 | Satisfactory | Satisfactory | 0.19 | 0.045 |
| 12 | 10 | 0.01 | 0.02 | 0.8 | 70 | 330 | 41 | Satisfactory | Satisfactory | 0.18 | 0.458 |
| 13 | 10 | 0.01 | 0.02 | 0.35 | 10 | 390 | 12 | Satisfactory | Satisfactory | 0.19 | 0.027 |
| 14 | 10 | 0.01 | 0.02 | 0.6 | 10 | 390 | 13 | Satisfactory | Satisfactory | 0.17 | 0.043 |
| 15 | 10 | 0.01 | 0.02 | 0.8 | 10 | 390 | 12 | Satisfactory | Satisfactory | 0.2 | 0.431 |
| 16 | 10 | 0.01 | 0.0005 | 0.3 | 40 | 360 | 0 | Unsatisfactory | Satisfactory | 0.17 | 0.021 |
| 17 | 10 | 0.01 | 0.002 | 0.3 | 40 | 360 | 0 | Unsatisfactory | Satisfactory | 0.18 | 0.023 |
| 18 | 10 | 0.01 | 0.02 | 0.3 | 40 | 360 | 0 | Unsatisfactory | Satisfactory | 0.17 | 0.022 |
| 19 | 10 | 0.01 | 0.045 | 0.3 | 40 | 360 | 0 | Unsatisfactory | Satisfactory | 0.19 | 0.021 |
| 20 | 10 | 0.01 | 0.06 | 0.3 | 40 | 360 | 0 | Unsatisfactory | Black | Perforated | 0.023 |
| 21 | 10 | 0.01 | 0.1 | 0.3 | 40 | 360 | 0 | Unsatisfactory | Black | Perforated | 0.023 |
| 22 | 10 | 0.01 | 0.0005 | 0.4 | 40 | 360 | 13 | Unsatisfactory | Satisfactory | 0.18 | 0.034 |
| 23 | 10 | 0.01 | 0.06 | 0.4 | 40 | 360 | 0 | Unsatisfactory | Black | Perforated | 0.036 |
| 24 | 10 | 0.01 | 0.2 | 0.4 | 40 | 360 | 0 | Unsatisfactory | Black | Perforated | 0.033 |
| 25 | 10 | 0.01 | 0.0005 | 0.6 | 40 | 360 | 14 | Unsatisfactory | Satisfactory | 0.19 | 0.046 |
| 26 | 10 | 0.01 | 0.06 | 0.6 | 40 | 360 | 0 | Unsatisfactory | Black | Perforated | 0.044 |
| 27 | 10 | 0.01 | 0.1 | 0.6 | 40 | 360 | 0 | Unsatisfactory | Black | Perforated | 0.045 |
| 28 | 10 | 0.01 | 0.2 | 0.6 | 40 | 360 | 0 | Unsatisfactory | Black | Perforated | 0.043 |
| 29 | 10 | 0.01 | 0.0005 | 0.75 | 40 | 360 | 10 | Unsatisfactory | Satisfactory | 0.19 | 0.068 |
| 30 | 10 | 0.01 | 0.06 | 0.75 | 40 | 360 | 0 | Unsatisfactory | Black | Perforated | 0.066 |
| 31 | 10 | 0.01 | 0.0005 | 0.85 | 40 | 360 | 12 | Unsatisfactory | Brown | 0.22 | 0.531 |
| 32 | 10 | 0.01 | 0.002 | 0.85 | 40 | 360 | 12 | Unsatisfactory | Brown | 0.2 | 0.523 |
| 33 | 10 | 0.01 | 0.02 | 0.85 | 40 | 360 | 13 | Unsatisfactory | Brown | 0.17 | 0.523 |
| 34 | 10 | 0.01 | 0.045 | 0.85 | 40 | 360 | 14 | Unsatisfactory | Brown | 0.18 | 0.538 |
| 35 | 10 | 0.01 | 0.06 | 0.85 | 40 | 360 | 0 | Unsatisfactory | Black | Perforated | 0.563 |
| 36 | 10 | 0.01 | 0.1 | 0.85 | 40 | 360 | 0 | Unsatisfactory | Black | Perforated | 0.534 |
| 37 | 10 | 0.01 | 0.02 | 0.3 | 70 | 330 | 0 | Unsatisfactory | Satisfactory | 0.22 | 0.001 |
| 38 | 10 | 0.01 | 0.02 | 0.85 | 70 | 330 | 13 | Unsatisfactory | Brown | 0.19 | 0.517 |
| 39 | 10 | 0.01 | 0.02 | 0.3 | 10 | 390 | 0 | Unsatisfactory | Satisfactory | 0.2 | 0.172 |
| 40 | 10 | 0.01 | 0.02 | 0.85 | 10 | 390 | 13 | Unsatisfactory | Brown | 0.17 | 0.562 |

The Mg diffusion characteristics, brazeability, and the post-brazing corrosion resistance were evaluated for test materials 1-40. The evaluation method for each item is as below.

<Mg Diffusion Characteristics>

Test pieces, each having a width of 25 mm and a length of 60 mm, were sampled from test materials 1-40. The test pieces were heated using a two-chamber furnace equipped with a preheating chamber and a brazing chamber, and the Mg concentrations on the filler-material surfaces after heating were measured.

Nitrogen gas was supplied into the preheating chamber and the brazing chamber while adjusting the flow rate so that the in-furnace oxygen concentration became 30-40 ppm.

The test pieces were placed in the brazing chamber and then heated such that the heating time, from when the temperature of the test pieces had reached 450° C. until the temperature reached 577° C., was 6 min ±10 s. After the temperature of the test pieces reached 577° C., the test pieces were immediately moved to the preheating chamber and cooled to 450° C. Thereafter, the test pieces were removed from the furnace and cooled.

The removed test pieces were cut to expose a cross section in which the test pieces could be observed in the plate-thickness direction. Furthermore, the Mg concentrations on the filler-material surfaces were measured by performing line analysis on the filler-material surfaces using an EPMA (electron probe microanalyzer). The measurement conditions of the line analysis were: acceleration voltage: 20 kV; beam diameter: 1 µm; measurement interval: 0.3 µm; and measurement time: 0.12 s. The Mg concentration of each test material was as listed in the "Post-Heating Mg Concentration" column in Table 1.

<Gap-Filling Test>

For the evaluation of brazeability, gap-filling tests were performed using the test materials. A horizontal plate 2 having a width of 25 mm and a length of 60 mm was sampled from each test material. In addition, separately from the horizontal plate 2, a vertical plate 3 composed of a JIS A3003 alloy and having a width of 25 mm, a length of approximately 55 mm, and a thickness of 1 mm, was manufactured. The horizontal plate 2 and the vertical plate 3 were degreased using acetone, after which they were assembled as shown in FIG. 1 to manufacture a gap-filling test piece 1. As shown in FIG. 1, the vertical plate 3 is disposed in an orientation orthogonal to the horizontal plate 2, and a one end 31 of the vertical plate 3 in the longitudinal direction makes contact with a filler material 21 of the horizontal plate 2. In addition, a spacer 4 composed of a stainless-steel round wire having a diameter of 1.6 mm, is interposed between the other end 32 of the vertical plate 3 in the longitudinal direction and the horizontal plate 2. More specifically, the spacer 4 is spaced apart by 55 mm in the horizontal direction from the location (the one end 31) at which the vertical plate 3 makes contact with the horizontal plate 2. In addition, when the test piece 1 is viewed from a top view, the other end 32 of the vertical plate 3 is disposed such that it coincides with the spacer 4 and an end part 201 of the horizontal plate 2 in the longitudinal direction.

The test piece shown in FIG. 1 was joined by braising using the two-chamber furnace discussed above. First, the test piece was heated in the preheating chamber to 450° C. in approximately 7 min, and subsequently the test piece was transferred to the brazing chamber. In the brazing chamber, the test piece was heated until it reached 577° C. in approximately 6 min. After reaching 577° C., heating was further continued to bring the temperature of the test piece to 600° C. After the temperature of 600° C. was held for 3 min, the test piece was returned to the preheating chamber. In the preheating chamber, the temperature of the test piece was lowered to 500° C., and thereafter the test piece was removed from the furnace and cooled. During heating when brazing was being performed, nitrogen gas was supplied while the flow rate was adjusted so that the in-furnace oxygen concentration of the preheating chamber and the brazing chamber became 30-40 ppm. At the point in time when heating during brazing ended, the in-furnace oxygen concentration of the preheating chamber and the brazing chamber was 30-40 ppm, and the dew point was −45 to −35° C.

The gap-filling length, the fillet external appearance, and the surface external appearance of the test piece that was subjected to brazing as described above were evaluated. The "Gap-Filling Length" column in Table 1 lists, for each test piece 1, the length between the horizontal plate 2 and the vertical plate 3 that was filled by filler material 22 (refer to symbol L in FIG. 1). In case the length was 10 mm or more when the thickness of the filler material 21 of the test material (the horizontal plate 2) was 10 µm, or the length was 25 mm or more when the thickness was 40 or the length was 35 mm or more when the thickness was 70 µm, the test material was judged to have practical (a practical level of) brazeability.

"Satisfactory" was recorded in the "Fillet External Appearance" column in Table 1 in case, when the test piece was viewed from above, the fillet had left-right symmetry with respect to the vertical plate and the surfaces were smooth. In addition, if the fillet had left-right asymmetry with respect to the vertical plate or unevenness of the surfaces was great, then "Unsatisfactory" was recorded.

In "Surface Color Tone" in Table 1, "Satisfactory" was recorded in case the horizontal plate after brazing maintained a metallic luster; otherwise, the color of the horizontal plate after brazing was recorded.

<CASS Test>

For the purpose of the corrosion-resistance evaluation, the CASS test stipulated in JIS H8681 was performed for 4000 h using the test pieces after they had been subjected to brazing in the gap-filling test. After the test was complete, the corrosion state of the portion of the filler-material side of the horizontal plate (the test material), excluding the fillet, was observed, and the depths of corrosion pits were measured. The depth of the deepest corrosion pit was recorded in the "Maximum Corrosion Depth" column in Table 1. In addition, "Perforated" was recorded in case the corrosion pit passed through the horizontal plate.

As can be understood from Table 1, for each of the test materials 1-15, the gap-filling length reached a practical level, and the fillet external appearance and surface color tone were both satisfactory. Based on these results, it became clear that, in an inert-gas atmosphere that can be achieved in a common production furnace, fluxless brazing could be performed by using brazing sheets in which the amount of Mg in the core and the amount of Bi in the filler material were limited to the above-mentioned specific ranges.

In addition, the test materials 1-15 did not generate through holes or the like in the CASS tests and had excellent corrosion resistance.

On the other hand, in test materials 16-39, the gap-filling length did not reach a practical level, and in all of test materials 16-40 the fillet external appearance had an uneven shape. In each of the test materials 20, 21, 23, 24, 26, 27, 28, 30, 35, 36, a large amount of black oxides formed on the filler material surface after heating when brazing was performed, and the surface color tone exhibited a black color. In these test materials, it was considered that a large amount of Bi oxides was formed when heating during brazing because there was an excessive amount of Bi in the filler material. In each of the test materials 16-19, 37, 39, the post-brazing surface color tone was satisfactory, but the fillet external appearance was poor. In these test materials, it was considered that the effect of breaking up the oxide films could not be sufficiently achieved because the amount of Mg in the core was small. In each of the test materials 31-34, 38, 40, a large amount of a brown oxide was formed on the filler material surface after heating, and the surface color tone exhibited a brown color. In these test materials, it was considered that a large amount of Mg oxides was formed during heating when brazing because there was an excessive amount of Mg in the core. In addition, in each of the test materials 22, 25, 29, the fillet external appearance was poor because the amount of Bi in the filler material was small.

In each of the test materials 20, 21, 23, 24, 26, 27, 28, 30, 35, 36, a through hole was created by the CASS test. In these test materials, it was considered that corrosion resistance decreased because a large amount of Bi in the filler material was present in the simple substance state after the heating during brazing.

In the results of the EPMA line analyses, for the test materials in which the Mg content of the core was more than 0.8%, more than 0.5% Mg was detected from the filler-material surface after heating for both the case (test materials 31-36, 40) in which the filler-material thickness was less than 60 μm and the case (test material 38) in which the filler-material thickness was 60 μm or more. In these test materials, because the Mg concentration in the core was high, the amount of Mg that diffuses into the filler material during heating was large. In addition, because the Mg that diffused into the filler material leads to a decrease in the melting point, the filler material tended to melt before the temperature reached 577° C. As a result, the cause was considered to be that the amount of Mg that reached the filler-material surface became large.

Figure 2:
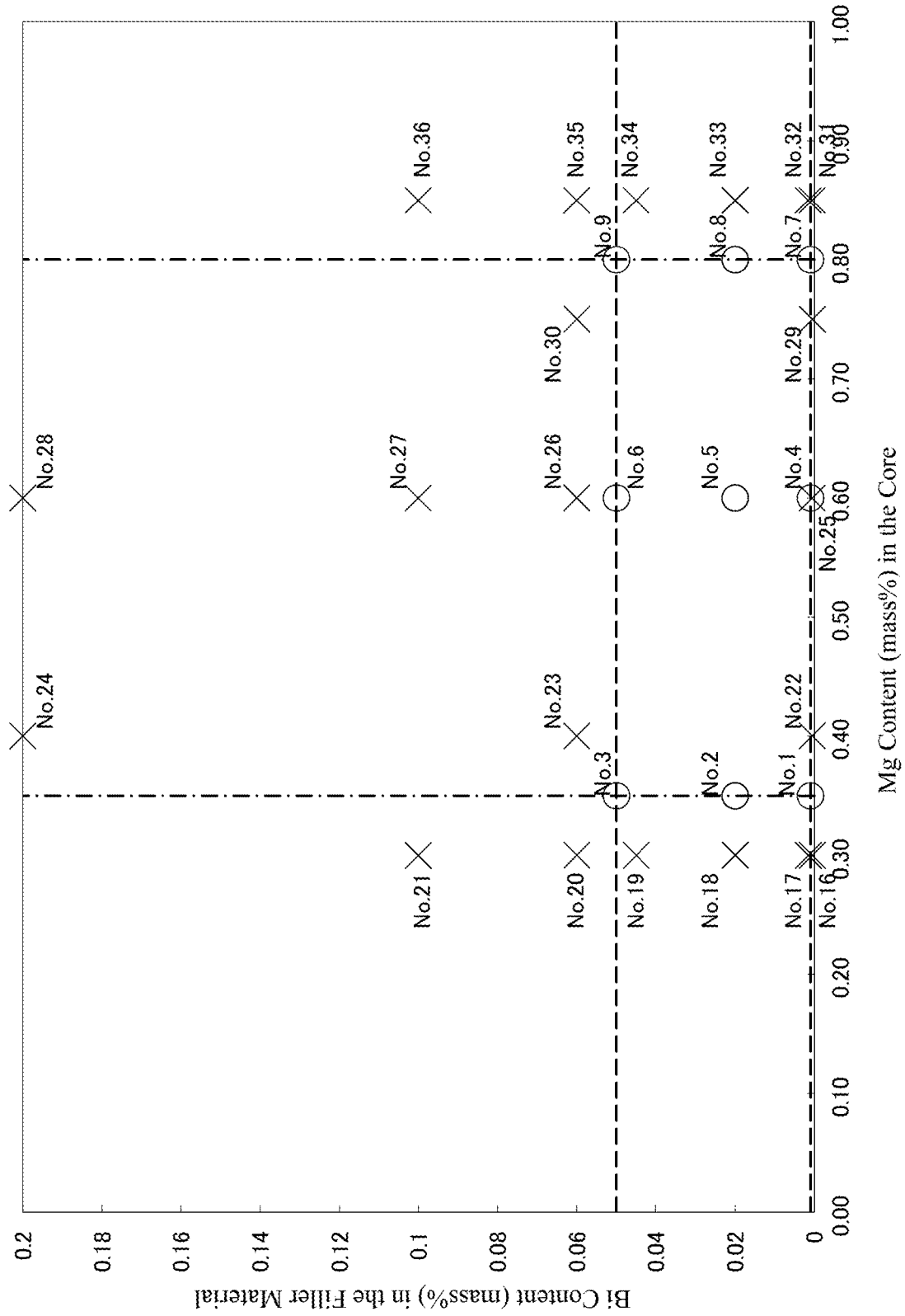
FIG. 2 is an explanatory diagram that shows, according to the embodiments, the relationship of the formation state of fillets versus the Mg content in the core and the Bi content in the filler material.

All the above results are summarized in FIG. 2. The abscissa in FIG. 2 is the Mg content in the core of each test material, and the ordinate is the Bi content in the filler material. Test materials for which all items, that is, brazeability, fillet external appearance, surface color tone, and corrosion resistance, were satisfactory are indicated by the "○" symbol in FIG. 2. In addition, test materials that did not satisfy the criteria of any one of the items are indicated by the "×" symbol in FIG. 2.

Test Example 2

The present example is an example of brazing sheets to which elements, such as Be and Li, have been intentionally added to the filler materials, as shown in Table 2. Other than the fact that the chemical compositions of the cores and the filler materials were modified as shown in Table 2, the test materials (test materials 41-56) of the present example were manufactured in the same manner as in test example 1.

The gap-filling test for each of test materials 41-56 was performed using the same method as in test example 1, after which the measurement of the gap-filling length and the evaluation of the fillet external appearance were performed. Those results are shown in Table 2.

TABLE 2

| Test Material | Chemical Composition (mass %) | | | | | | | | | | Thickness (μm) | | Gap-Filling Length (mm) | Fillet External Appearance |
|---|---|---|---|---|---|---|---|---|---|---|---|---|---|---|
| | Filler Material | | | | | | | | | Core | Filler Material | Core | | |
| | Si | Mg | Bi | Be | Ca | Li | Na | Y | La | Ce | Mg | | | | |
| 41 | 10 | 0.01 | 0.02 | <0.00001 | <0.0019 | <0.00001 | <0.00003 | <0.00001 | <0.00001 | <0.00001 | 0.6 | 40 | 360 | 30 | Satisfactory |
| 42 | 10 | 0.01 | 0.02 | 0.0005 | <0.0019 | <0.00001 | <0.00003 | <0.00001 | <0.00001 | <0.00001 | 0.6 | 40 | 360 | 28 | Satisfactory |
| 43 | 10 | 0.01 | 0.02 | <0.00001 | 0.005 | <0.00001 | <0.00003 | <0.00001 | <0.00001 | <0.00001 | 0.6 | 40 | 360 | 28 | Satisfactory |
| 44 | 10 | 0.01 | 0.02 | <0.00001 | <0.0019 | 0.002 | <0.00003 | <0.00001 | <0.00001 | <0.00001 | 0.6 | 40 | 360 | 29 | Satisfactory |
| 45 | 10 | 0.01 | 0.02 | <0.00001 | <0.0019 | <0.00001 | 0.0006 | <0.00001 | <0.00001 | <0.00001 | 0.6 | 40 | 360 | 31 | Satisfactory |
| 46 | 10 | 0.01 | 0.02 | <0.00001 | <0.0019 | <0.00001 | <0.00003 | 0.007 | <0.00001 | <0.00001 | 0.6 | 40 | 360 | 30 | Satisfactory |
| 47 | 10 | 0.01 | 0.02 | <0.00001 | <0.0019 | <0.00001 | <0.00003 | <0.00001 | 0.005 | <0.00001 | 0.6 | 40 | 360 | 27 | Satisfactory |
| 48 | 10 | 0.01 | 0.02 | <0.00001 | <0.0019 | <0.00001 | <0.00003 | <0.00001 | <0.00001 | 0.006 | 0.6 | 40 | 360 | 26 | Satisfactory |
| 49 | 10 | 0.08 | 0.02 | <0.00001 | <0.0019 | <0.00001 | <0.00003 | <0.00001 | <0.00001 | <0.00001 | 0.6 | 40 | 360 | 13 | Unsatisfactory |
| 50 | 10 | 0.01 | 0.02 | 0.001 | <0.0019 | <0.00001 | <0.00003 | <0.00001 | <0.00001 | <0.00001 | 0.6 | 40 | 360 | 15 | Unsatisfactory |
| 51 | 10 | 0.01 | 0.02 | <0.00001 | 0.01 | <0.00001 | <0.00003 | <0.00001 | <0.00001 | <0.00001 | 0.6 | 40 | 360 | 13 | Unsatisfactory |
| 52 | 10 | 0.01 | 0.02 | <0.00001 | <0.0019 | 0.004 | <0.00003 | <0.00001 | <0.00001 | <0.00001 | 0.6 | 40 | 360 | 13 | Unsatisfactory |
| 53 | 10 | 0.01 | 0.02 | <0.00001 | <0.0019 | <0.00001 | 0.001 | <0.00001 | <0.00001 | <0.00001 | 0.6 | 40 | 360 | 14 | Unsatisfactory |
| 54 | 10 | 0.01 | 0.02 | <0.00001 | <0.0019 | <0.00001 | <0.00003 | 0.01 | <0.00001 | <0.00001 | 0.6 | 40 | 360 | 14 | Unsatisfactory |
| 55 | 10 | 0.01 | 0.02 | <0.00001 | <0.0019 | <0.00001 | <0.00003 | <0.00001 | 0.01 | <0.00001 | 0.6 | 40 | 360 | 12 | Unsatisfactory |
| 56 | 10 | 0.01 | 0.02 | <0.00001 | <0.0019 | <0.00001 | <0.00003 | <0.00001 | <0.00001 | 0.01 | 0.6 | 40 | 360 | 14 | Unsatisfactory |

As can be understood from Table 2, in case the thickness of the filler material was 40 μm, brazeability that presented no problem from a practical standpoint could be obtained even if a minute amount of readily-oxidizable elements, such as Mg, Be and Li, was added to the filler material (test materials 41-48). However, in each of test materials 41-48, the gap-filling length was equal to or slightly less than test material 5 (refer to Table 1), to which these elements were not actively added. On the other hand, in each of the test materials 49-56, to which Mg, etc. was excessively added to the filler material, brazeability greatly decreased.

Test Example 3

The present example is an example of brazing sheets in which the chemical compositions of the filler materials and the cores were modified as shown in Table 3. Other than the fact that the chemical compositions of the cores and the filler materials were modified as shown in Table 3, the test materials (test materials 57-64) of the present example were manufactured in the same manner as in test example 1.

The gap-filling test and the CASS test of each of test materials 57-64 were performed using the same methods as in test example 1, after which the measurements of the gap-filling length and the maximum corrosion depth and the evaluation of the fillet external appearance were performed. Those results are shown in Table 3.

previously discussed, each test material of the present example was manufactured in the same manner as in test example 1.

In the present example, the evaluations of the Mg diffusion characteristics and the gap-filling tests were performed in the same manner as in test example 1, with the heating conditions modified (condition A to condition I) such that the heating times from when the temperature of the test materials reached 450° C. until it reached 557° C. were the times shown in Table 4. Those results are shown in Table 4.

TABLE 4

| Condition | Heating Time | Gap-Filling Length (mm) | Fillet External Appearance | Surface Color Tone | Post-Heating Mg Concentration (mass %) |
|---|---|---|---|---|---|
| A | 5 min | 28 | Satisfactory | Satisfactory | 0.025 |
| B | 5 min 30 s | 33 | Satisfactory | Satisfactory | 0.033 |

TABLE 3

| | Chemical Composition (mass %) | | | | | | | | | | | Thickness (μm) | | Gap-Filling Length (mm) | Fillet External Appearance | Maximum Corrosion Depth (mm) |
|---|---|---|---|---|---|---|---|---|---|---|---|---|---|---|---|---|
| Test Material | Filler Material | | | | Core | | | | | | | | | | | |
| | Si | Mg | Bi | Zn | Si | Fe | Cu | Mn | Mg | Cr | Zn | Ti | Filler Material | Core | | | |
| 57 | 10 | 0.01 | 0.02 | 0.1 | — | — | — | — | 0.6 | — | — | — | 40 | 360 | 40 | Satisfactory | 0.1 |
| 58 | 10 | 0.01 | 0.02 | 5.0 | — | — | — | — | 0.6 | — | — | — | 40 | 360 | 39 | Satisfactory | 0.09 |
| 59 | 10 | 0.01 | 0.02 | — | — | — | 0.5 | — | 0.6 | — | — | — | 40 | 360 | 34 | Satisfactory | 0.07 |
| 60 | 10 | 0.01 | 0.02 | — | — | — | — | 1.2 | 0.6 | — | — | — | 40 | 360 | 35 | Satisfactory | 0.08 |
| 61 | 10 | 0.01 | 0.02 | 0.25 | 0.25 | 0.6 | 0.15 | 1.05 | 0.6 | 0.02 | 0.01 | 0.01 | 40 | 360 | 34 | Satisfactory | 0.09 |
| 62 | 10 | 0.01 | 0.02 | 0.35 | 0.35 | 0.3 | 0.27 | 0.02 | 0.6 | 0.02 | 0.01 | 0.01 | 40 | 360 | 35 | Satisfactory | 0.11 |
| 63 | 10 | 0.01 | 0.02 | 0.05 | — | — | — | — | 0.6 | — | — | — | 40 | 360 | 34 | Satisfactory | 0.19 |
| 64 | 10 | 0.01 | 0.02 | 5.5 | — | — | — | — | 0.6 | — | — | — | 40 | 360 | 33 | Satisfactory | 0.21 |

As can be understood from Table 3, in each of test materials 57 and 58, in which the filler material contained Zn in the specified range, brazeability and corrosion resistance were further improved beyond those of test material 5, which did not contain Zn.

In addition, in each of test materials 59-62, in which the core contained Cu and/or Mn in the specified ranges, corrosion resistance was further improved beyond that of test material 5, which did not contain Cu and Mn. Furthermore, the core of test material 61 was an alloy classified in the JIS A3000-based alloys, and the core of test material 62 was an alloy classified in the JIS A6000-based alloys.

In each of test materials 63 and 64, because the Zn content in the filler material deviated from the specified range, the effect of improving brazeability and corrosion resistance was insufficient.

Test Example 4

The present example is an example in which brazing was performed wherein the heating conditions during heating when brazing was performed were variously modified. Each test material of the present example comprised: a filler material having a chemical composition that contained Si: 10%, Mg: 0.01%, and Bi: 0.02%, the remainder being composed of Al and unavoidable impurities; and a core having a chemical composition that contained Mg: 0.60%, the remainder being composed of Al and unavoidable impurities. In addition, the thickness of the filler material was set to 40 μm, and the thickness of the core was set to 360 μm. Other than the core and the filler material being modified as TABLE 4-continued

| Condition | Heating Time | Gap-Filling Length (mm) | Fillet External Appearance | Surface Color Tone | Post-Heating Mg Concentration (mass %) |
|---|---|---|---|---|---|
| C | 6 min | 35 | Satisfactory | Satisfactory | 0.046 |
| D | 6 min 30 s | 32 | Satisfactory | Satisfactory | 0.18 |
| E | 7 min | 27 | Satisfactory | Satisfactory | 0.35 |
| F | 3 min | 0 | Unsatisfactory | Satisfactory | 0.01 |
| G | 4 min 30 s | 20 | Unsatisfactory | Satisfactory | 0.012 |
| H | 7 min 30 s | 23 | Unsatisfactory | Brown | 0.52 |
| I | 9 min | 0 | Unsatisfactory | Brown | 0.55 |

As can be understood from Table 4, brazeability, fillet external appearance, and surface color tone were all satisfactory for the test materials in which heating during brazing was performed using condition A to condition E. In each test material in which heating during brazing was performed using condition F and condition G, because the temperature was raised in a time shorter than in condition A, the amount of Mg that diffused to the surface was smaller than in condition A. Consequently, the break-up of the oxide film by Mg was insufficient, and brazeability decreased. In the test materials in which heating during brazing was performed using condition H and condition I, because the temperature was raised over a time period longer than in condition E, the amount of Mg that diffused to the surface was greater than in condition E. Consequently, a large amount of Mg oxides was formed on the surface, and brazeability decreased.

The invention claimed is:

1. An aluminum-alloy brazing sheet for brazing in an inert-gas atmosphere without using a flux, consisting of a core and a filler material clad to one side or both sides of the core, wherein:
    the core has a chemical composition consisting of Mg: 0.35-0.8% (mass %; likewise hereinbelow)), and Si: 0.25% or less, Cu: 0.8% or less, Mn: 1.8% or less, Fe: 1.0% or less, Cr: 0.35% or less, Zn: 0.4% or less, and Ti: 0.10% or less, the remainder being Al and unavoidable impurities;
    the filler material has a chemical composition consisting of Si: 6-13% and Bi: 0.001-0.05%, Zn: 5.0% or less, and Mg: 0.01% or less, the remainder being Al and unavoidable impurities; and
    the filler material is an outermost layer of the aluminum-alloy brazing sheet.

2. The aluminum-alloy brazing sheet according to claim 1, wherein the filler material further contains Zn: 0.1-5.0%.

3. The aluminum-alloy brazing sheet according to claim 1, wherein the core contains at least one element selected from the group consisting of Cu: 0.05-0.8% and Mn: 0.01-1.8%.

4. The aluminum-alloy brazing sheet according to claim 1, wherein the core contains at least one from among Si: 0.1-0.25%, Fe: 0.3-1.0%, Cr: 0.01-0.35%, Zn: 0.01-0.4%, and Ti: 0.01-0.10%.

5. The aluminum-alloy brazing sheet according to claim 1, wherein the filler material has a thickness of 10-100 µm.

6. The aluminum-alloy brazing sheet according to claim 1, wherein the core has a thickness of 330-390 µm.

7. The brazing sheet according to claim 1, wherein the filler material contains Bi: 0.001-0.02%.

8. An aluminum-alloy brazing sheet for brazing in an inert-gas atmosphere without using a flux, consisting of a core and a filler material clad to one side or both sides of the core, wherein:
    the core has a chemical composition consisting of Mg: 0.35-0.8% (mass %; likewise hereinbelow), Si: 0.25% or less, Cu: 0.8% or less, Mn: 1.8% or less, Fe: 1.0% or less, Cr: 0.35% or less, Zn: 0.4% or less, and Ti: 0.10% or less, the remainder being Al and unavoidable impurities;
    the filler material has a chemical composition consisting of Si: 6-13%, Bi: 0.001-0.05%, Zn: 5.0% or less, Mg: 0.01% or less, Be: less than 0.001%, Ca: less than 0.01%, Li: less than 0.004%, Na: less than 0.001%, Y: less than 0.01%, La: less than 0.01%, and Ce: less than 0.01%, the remainder being Al and unavoidable impurities; and
    the filler material is an outermost layer of the aluminum-alloy brazing sheet.

9. The aluminum-alloy brazing sheet according to claim 8, wherein the filler material contains Zn: 0.1-5.0%.

10. The aluminum-alloy brazing sheet according to claim 8, wherein the core contains at least one from among Cu: 0.05-0.8% and Mn: 0.01-1.8%.

11. The aluminum-alloy brazing sheet according to claim 8, wherein the core contains at least one from among Si: 0.1-0.25%, Fe: 0.3-1.0%, Cr: 0.01-0.35%, Zn: 0.01-0.4%, and Ti: 0.01-0.10%.

12. The aluminum-alloy brazing sheet according to claim 8, wherein the core and the filler material are configured such that the Mg concentration of an exterior surface of the filler material of the brazing sheet, after the temperature has been raised from 450° C. to 577° C. in 5-7 min and a cooling process has been subsequently performed, is less than 0.5 mass %.

13. The aluminum-alloy brazing sheet according to claim 9, wherein the core contains at least one element selected from the group consisting of Cu: 0.05-0.8% and Mn: 0.01-1.8%.

14. The aluminum-alloy brazing sheet according to claim 13, wherein the core contains at least one from among Si: 0.1-0.25%, Fe: 0.3-1.0%, Cr: 0.01-0.35%, Zn: 0.01-0.4%, and Ti: 0.01-0.10%.

15. The aluminum-alloy brazing sheet according to claim 14, wherein the filler material has a thickness of 10-100 µm.

16. The aluminum-alloy brazing sheet according to claim 14, wherein the filler material has a thickness of 60-100 µm.

17. The aluminum-alloy brazing sheet according to claim 14, wherein the core has a thickness of 330-390 µm.

18. The brazing sheet according to claim 8, wherein the filler material contains Bi: 0.001-0.02%.

19. A brazing sheet consisting of one of:
    a first metallic layer clad to one outer side of a second metallic layer; or
    a first metallic layer clad to both outer sides of a second metallic layer;
    wherein:
    the second metallic layer is a core composed of an aluminum alloy consisting of Mg: 0.35-0.8% (mass %; likewise hereinbelow), and Si: 0.25% or less Cu: 0.8% or less, Mn: 1.8% or less, Fe: 1.0% or less, Cr: 0.35% or less, Zn: 0.4% or less, Ti: 0.10% or less, and unavoidable impurities; and
    the first metallic layer is a filler material composed of an aluminum alloy consisting of Si: 6-13% Bi: 0.001-0.05% Zn: 5.0% or less, Mg: 0.01% or less, and unavoidable impurities.

20. The brazing sheet according to claim 19, wherein the filler material contains Zn: 0.1-5.0%.

21. The brazing sheet according to claim 19, wherein the core contains at least one element selected from the group consisting of Cu: 0.05-0.8% and Mn: 0.01-1.8%.

22. The brazing sheet according to claim 19, wherein the core contains at least one from among Si: 0.1-0.25%, Fe: 0.3-1.0%, Cr: 0.01-0.35%, Zn: 0.01-0.4%, and Ti: 0.01-0.10%.

23. The brazing sheet according to claim 19, wherein the filler material contains Bi: 0.001-0.02%.

* * * * *